Aug. 11, 1925.

A. P. LUNDIN 1,549,320

HEAT INSULATING STRUCTURAL MATERIAL

Filed Aug. 8, 1921

Patented Aug. 11, 1925.

1,549,320

UNITED STATES PATENT OFFICE.

ANDREAS P. LUNDIN, OF BAYSIDE, NEW YORK, ASSIGNOR, BY MESNE ASSIGNMENTS, TO AMERICAN BALSA WOOD CORPORATION, A CORPORATION OF NEW YORK.

HEAT-INSULATING STRUCTURAL MATERIAL.

Application filed August 8, 1921. Serial No. 490,769.

*To all whom it may concern:*

Be it known that I, ANDREAS P. LUNDIN, a citizen of the United States, and a resident of Bayside, borough of Queens, county of Queens, and State of New York, have invented certain new and useful Improvements in Heat-Insulating Structural Materials, of which the following is a specification.

This invention relates to improvements in a heat-insulating structural material.

One of the objects of this invention is to produce a heat-insulating structural material from a core of wood, and particularly a core of wood of light, specific gravity with heat-insulating qualities, and a surface layer or layers of metal, preferably sheet steel, by the use of a cementitious material that will cause a thorough and secure adhesion and a substantially inseparable union between the wood and metal over all the parts of the cemented surface to be procured. My invention, therefore, in a greater degree than would otherwise be possible causes said layers of metal and core of wood to act as a single unit or body to resist any pressure or strain placed thereon as it will be understood that the stronger the union between the surface layers and the core the better these two parts of the structure will cooperate with each other to produce a perfect unit capable for use as a structural material and having a maximum of strength.

In the preferred construction of my heat-insulating structural material, I employ a core of the tropical wood known as balsa wood (*Ochroma lagopus*) which has first been treated with paraffin to preserve and waterproof the same, and a surface layer or layers of steel which I cement to the said core by the use of bituminous cement, a layer or sprinkling of sand and a layer of farbric penetrable by the bituminous cement. I am thus enabled to procure a more thorough and secure adhesion and stronger union between the surfaces of said outer layers of steel and said wooden core than it is possible to obtain by the use of ordinary cements or glues.

I have found that by the use of a bituminous cement alone only a relatively weak adhesion may be secured but that by the addition to such bituminous cement of a layer of sand or similar material, I am enabled to increase the strength of the joint between the core and suface layer, and furthermore that by the use of a layer of saturable fabric such as cheese cloth or like material, I am enabled still further to increase the strength of the joint between said surface layer and the core.

In cementing the said surface layers to the core, I prefer to coat both surfaces which it is desired to fasten together with a bituminous cement and then to add to one of such bituminous coated surfaces a light coating or sprinkling of sand and to place upon the other bituminous-coated surface a layer of thin fabric, such as cheese cloth, after which the coated surfaces of the surface layer and wooden core are brought into contact and a suitable amount of pressure is applied and preferably also a sufficient amount of heat is applied to procure a melting of the bitumen.

In practice, I have found by tests of the strength of the material that the addition of fabric of the character specified increases the strength of the joint approximately 30%, and that the addition of both sand and fabric increases the strength of the joint an additional 10%.

A composite material formed in accordance with this invention will possess heat-insulating properties of a high-degree, the core of which will be permanent in character and will not shake down or disintegrate under vibration, and the composite structure will possess great structural strength, lightness in weight, durability, hardness of surface and fire-resisting qualities. Such material may be used for boiler casings and in the building up of panels for use as the walls of staterooms on boats and for the walls of refrigerator railway cars, refrigerating plants, refrigerating shipping boxes and other similar refrigerating structures designed to prevent the transmission of heat to or from goods transported or stored therein and for many other uses.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:—

Figure 1:
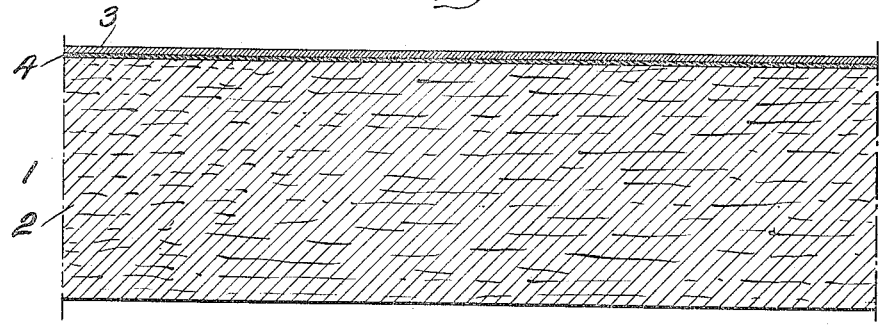
Fig. 1 is a longitudinal section through a portion of a unit embodying my invention with the steel plating applied to and cemented on one surface thereof.
Figure 2:
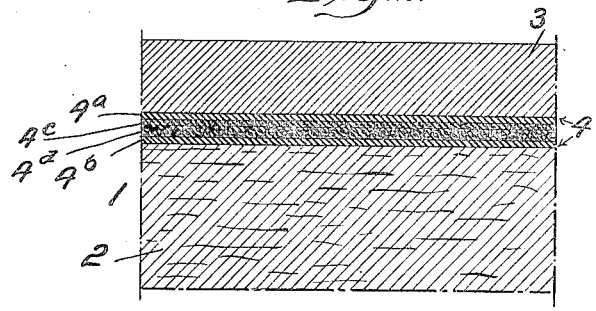
Fig. 2 is an enlarged fragmentary section of a portion of a unit such as shown in Fig. 1.

Referring now to Figs. 1 and 2 of these drawings, 1 indicates a composite structural unit formed of a core 2 and a metallic surface layer or plate 3 which is preferably formed of relatively thin steel plating. The core 2 preferably is composed of the species of wood known as balsa wood (*Ochroma lagopus*). This wood readily absorbs water and is preferably treated with paraffin or the like to preserve and make it waterproof. Such treatment is preferably carried out in accordance with reissue Letters Patent to Marr, #13,952 and the cells and pores of the wood are, by this process, encysted or coated with paraffin without materially adding to the weight of the wood. Such a core possesses heat-insulating properties of a high degree, permanency of structure in that it will not shake down or disintegrate under vibration and has relatively great structural strength, great resistance to strains of compression and torsion and lightness in weight. Said core is, however, relatively soft, porous and pithy in structure and offers but little resistance to local fracture or depression and when treated with paraffin is highly inflammable. The surface layer 3 which is composed of steel or other metal is cemented to the said preserved core 2 in such a manner as to procure a thorough and secure adhesion of the steel plates to the treated core to the end that the said steel plates and core will have a strong and substantially inseparable union over all parts of the cemented surface.

When so formed a structural unit is produced which will possess heat-insulating properties of a high degree, and the core of which will be permanent in character and will not shake down or disintegrate under vibration, and the composite structure will possess great structural strength, lightness in weight, durability, hardness of surface and fire-resisting qualities. Such material may be used for boiler casings and in the building up of panels for use as the walls of staterooms on boats and for the walls of refrigerator railway cars, refrigerating plants, refrigerating shipping boxes and other similar refrigerating structures designed to prevent the transmission of heat to or from goods transported or stored therein and for many other uses.

I find that I am enabled to procure only a relatively weak adhesion of the core and surface plates by the use of a bituminous cement alone, but that by the addition to the joint between such layers of a fabric, and preferably a light and inexpensive fabric penetrable by the bitumen, such as cheese cloth, I am enabled to increase the strength of the joint and by the addition of a layer or sprinkling of sand between the abutting layers I am enabled to materially increase the strength of the joint so secured. A thorough and complete adhesion between said surface layers and the core is thus produced.

In the preferred form of my invention I apply to the adjacent surfaces coats $4^a$ $4^b$ of bituminous cement of suitable consistency and of a type which is at present found on the market, then sprinkle sand $4^c$ over one of such coated surfaces and overlay the opposite surface with a thin fabric $4^d$ which is penetratable by the bitumen. As illustrated in the drawing, the sprinkling or layer of sand is contiguous to the bituminous coat on the steel plates and the fabric layer is disposed adjacent to the coated surface of the core. The two surfaces are then pressed together with any suitable press or pressure device and a sufficient amount of heat is applied to melt the bitumen. A cemented joint is thus formed of the combined materials that is exceedingly strong and durable and which will cause the metallic surface plate or plates to adhere so strongly as to cause the said core and metal plates to act as a single unit or body and to resist any pressure or strain imposed thereon. It will, of course, be understood that the stronger the union between the surface metallic layers and core, the better the two parts of the structure will cooperate with each other to produce a perfect composite structural unit with a maximum of strength and the other desirable characteristics hereinabove referred to.

Figure 3:
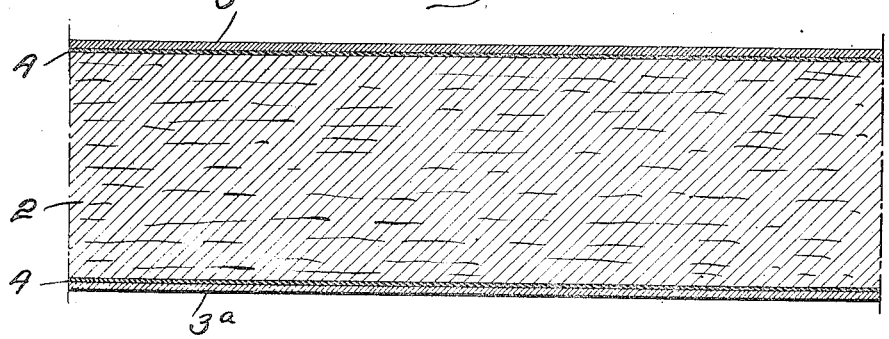
Fig. 3 is a longitudinal section of a portion of a unit with the steel plating applied on opposite sides of the core.

In Fig. 3, I have shown a modified form of my invention in which a core 2 is flanked on opposite sides by plates 3—$3^a$ of steel or like material which are cemented to the core by layers or films 4 of bituminous cement, cheese cloth and sand as hereinabove specified. Such a construction forms a structural element or unit which is suitable for use in many structures, and particularly in structures where lightness in weight combined with the other characteristics hereinabove specified are desired.

Having described my invention, I claim:—

1. A composite structural material formed of a core of wood having high heat insulating characteristics, a surface plate of metal, and a cementing medium for securing said wood core and surface plate together composed of bituminous cement and sandy material.

2. A composite structural material formed of a core of wood having high heat insulating characteristics, a surface plate of metal, and a cementing medium for securing said wood core and surface plate together composed of bituminous cement, a fabric penetrable by the bituminous cement and a sandy material.

3. A composite structural material formed of a core of wood having high heat insulating characteristics, surface plates of sheet metal flanking said core on opposite sides, and a cementing medium for securing said wood core and surface plates together composed of bituminous cement and sandy material.

4. A composite structural material formed of a core of wood having high heat insulating characteristics, surface plates of sheet metal flanking said core on opposite sides, and a cementing medium for securing said wood core and surface plates together composed of bituminous cement, a fabric penetrable by the bituminous cement and a sandy material.

5. A composite structural material formed of a core of balsa wood, surface plates of metal, and a cementing medium for securing said wood core and surface plates together composed on a bituminous cement and sandy material.

6. A composite structural material formed of a core of balsa wood, surface plates of metal flanking said core on opposite sides, and a cementing medium for securing said wood core and surface plates together composed of bituminous cement, a fabric penetrable by the bituminous cement and a sandy material.

In witness whereof, I have signed my name to the foregoing specification in the presence of two subscribing witnesses.

ANDREAS P. LUNDIN.

Witnesses:
HARRY BROODY,
HELEN V. WHIDDEN.